United States Patent Office 3,822,201
Patented July 2, 1974

3,822,201
METHOD AND APPARATUS FOR RENAL DIALYSIS MONITORING
John R. Waters, Towson, Md., assignor to William H. Johnston Laboratories, Inc., Baltimore, Md.
Filed Oct. 7, 1971, Ser. No. 187,514
Int. Cl. B01d 13/00, 31/00
U.S. Cl. 210—22         12 Claims

ABSTRACT OF THE DISCLOSURE

The application discloses method and apparatus for monitoring the progress of renal dialysis, i.e., removal of impurities from the bloodstream. A radioactively labelled glomerular substance is injected into the bloodstream. The radioactive substance is dialyzed from the bloodstream at substantially the same rate as the impurities. The exact relationship between the rates of removal of impurities and of the radioactive substance is determined experimentally. A detector is arranged to monitor the amount of radioactive material remaining in the bloodstream and to present a continuous readout showing the fraction of the initial radioactively labelled substance (and thereby the fraction of impurities) remaining in the bloodstream. The detection meter is initially calibrated to read 100% at the start of the dialysis procedure; dialysis is continued until a suitable reading such as 30% (meaning the level of remaining radioactive substance is 30% of the original level) is reached. A typical radioactive isotope material suitable for use as a labelling material is $In^{113m}$ or $Tc^{99m}$; a suitable glomerular substance suitable for use as a carrier is DTPA(diethyltriaminepentaacetic acid).

BACKGROUND OF THE INVENTION

This invention is directed to a closed loop renal dialysis monitoring system based on the use of short-lived radioactively labelled glomerular substances injected into the bloodstream as an impurity tracer material.

In the process called renal dialysis for patients with an inadequate kidney function, an external "artificial kidney" machine or dialyzer is connected into their bloodstream to remove impurities and cleanse the blood. A fraction of the patient's blood is passed through an extracorporeal loop having the dialyzer membrane inserted therein on a repeating cycle. The process is carried out over a six to eight hour period until the level of impurities in the blood, which are accumulated because of insufficient kidney function of the patient, has been lowered to a safe level by the dialysis process.

Typical dialysis requires six to eight hours, twice a week, the frequency and duration depending on such factors as the patient's previous food intake, his general health and many other factors of the dialysis operation as well as the efficiency of the dialyzer membrane in the kidney machine.

Sensors do not as yet exist, however, for the direct measurement of the impurities of the blood which must be considered. Examples of such impuritiy constituents of the bloodstream are urea, creatinine, phosphate and calcium.

It is possible to monitor the progress of this dialysis by periodically taking blood samples and chemically analyzing them for the presence of such impurities as constituents. An example of such a process is disclosed in the patent to Leonard, U.S. No. 3,459,176. However, up to now, no method or apparatus has been available to continuously monitor the progress of dialysis in order to discontinue it when blood impurity levels have dropped to predetermined safe values. Other known systems for studying the constituents of a bloodstream of a living animal are disclosed in patents to Jacques Espagno, U.S. No. 3,528,407; R. K. Dickey et al., U.S. No. 3,519,390; Raymond H. Edwards, U.S. No. 3,339,072; and I. W. Ruderman, U.S. No. 2,961,541.

SUMMARY OF THE INVENTION

It is therefore an object of this invention to provide improved method and apparatus for continuously monitoring the efficiency of kidney machine operation and the progress of renal dialysis.

Another object of the invention is to provide method and apparatus for determining the percentage of unwanted impurity constituents of the bloodstream without withdrawing any sample of the bloodstream or interfering with the operation of the dialyzing machine or any other equipment carrying the bloodstream.

To achieve these and other objects, method and apparatus are disclosed herein for monitoring the progress of renal dialysis, i.e. removal of impurities from the bloodstream. A radioactively labelled glomerular substance is injected into the bloodstream. The radioactive substance is dialyzed from the bloodstream at substantially the same rate as the impurities. The exact relationship between the rates of dialysis of the injected radioactively labelled substance and each of the impurity constituents of the bloodstream is determined experimentally. A detector is arranged to monitor the amount of the radioactive substance remaining in the bloodstream and to present a continuous readout showing the fraction of the initial radioactively labelled susbtance (and thereby the fraction of impurities) remaining in the bloodstream. The detection meter is initially calibrated to read 100% at the start of the dialysis procedure; dialysis is continued until a suitable reading such as 30% (meaning the level of remaining radioactive material is 30% of the original level) is reached. A typical radioactive isotope material suitable for use as a labelling substance is $In^{113m}$ or $Tc^{99m}$; a suitable glomerular substance for use as a carrier is DTPA (diethyltriamine-pentaacetic acid). For example, removal of this glomerular substance to the 30% level results in a decrease of the level of the impurity creatinine to about 40% of the original level. Other significant impurity constituents are reduced to substantially the same level.

A count rate meter is disclosed which measures the relative amount of radioactive material carried by the bloodstream by observing the counting rate induced in an radiation. As the preferred radioactive labelling isotopes have a rapid rate of radioactive decay, the count rate meter includes means to automatically compensate for this decay. The meter thus becomes more sensitive, as time goes on, by a factor related to the decay period or half-life of the isotope, cancelling the time dependence of the meter readings due to this radioactive decay.

BRIEF DESCRIPTION OF THE DRAWING

Other objects, aspects and advantages of this invention will become more apparent from the following description taken in connection with the accompanying drawing wherein.

DESCRIPTION OF A PREFERRED EMBODIMENT

Figure 1:
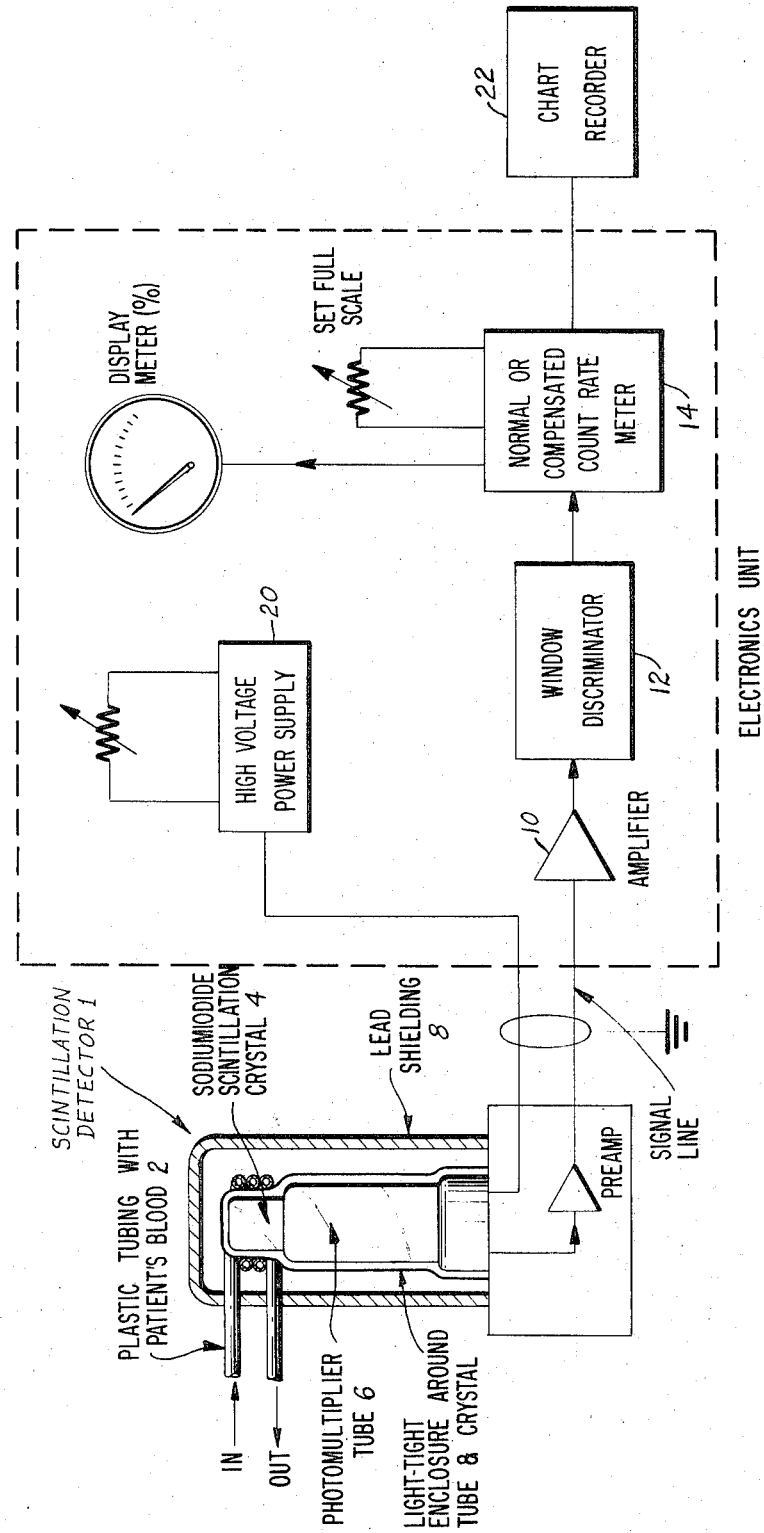
FIG. 1 is a schematic diagram in block diagram form of a preferred embodiment of the invention.

To monitor the renal dialysis process in accordance with this invention, radioactive material (preferably comprising a radioactively labelled glomerular substance) must be first introduced into the patient's bloodstream and allowed to equilibrate or distribute uniformly through the bloodstream. This may be done by injecting the material into a vein using a normal syringe or by injecting the material directly into the bloodstream through the venous line when the patent has been surgically fitted with an external shunt from artery to vein. It is preferable to wait for equilibration, as an error will be introduced if dialysis is started immediately.

After 20 to 30 minutes, the radioactive substance will have equilibrated and dialysis may be started. No changes in the normal dialysis procedure are required. The radioactively labelled glomerular substance will be dialyzed from the bloodstream at substantially the same rate as the impurity constituents thereof.

Many different substances can be used as the glomerular carrier for the radioactive isotope labelling substance; several different radioactive isotopes are also suitable, although short-lived radioactive material is preferable. Successful tests have been performed with DTPA (diethyltriaminepentaacetic acid) as the glomerular substance labelled with radioactive $In^{113m}$ or $Tc^{99m}$. The rapid rate or radioactive decay of $Tc^{99m}$ (6 hours) and $In^{113m}$ (2 hours) permits their safe use even in patients with severe renal disease.

The apparatus of this invention comprises a simple scintillation detector system 1 that provides an instantaneous automatic reading of the concentration of the radioactively labelled substance in the blood. The external monitoring provided by the invention does not interfere with routine dialysis. The method and apparatus are therefore of value in quality control in the design of dialysis membranes as well as for monitoring the use of dialysis systems in hospital and home.

Since each of the radioactive isotopes mentioned above emits gamma rays that may be detected easily by a sodium iodide scintillation counter, the system was designed to incorporate this device as the scintillation detector. The pulse count per minute output of this device indicates the level or radioactivity currently being measured. Other detectors of gamma rays could also be used, e.g. Geiger or proportional counter.

During a normal dialysis, blood from the patient's artery flows through a plastic tube 2, about ¼" diameter, to the dialyzer and then back to a vein. Exemplary dialysis machines which may be used in carrying out this method are a Western MPS Kül Dialyzer, Model 7200, or a disposable Cordis Dow Artifical Kidney, Model 2. Since a considerable length of extra tubing is provided with these dialysis machines to allow the patient to move freely in bed, 3 or 4 turns of this tubing 2 are wrapped around the outside of the encased sodium iodide scintillation crystal 4 mounted, in the usual way, on a photomultiplier tube 6. Lead shielding 8 is provided in cylindrical form around the phototube 6 and outside the closely wrapped plastic tube 2, the end of the lead cylinder 8 being closed with a lead plate. The purpose of the lead is to shield the crystal from the gamma radiation emitted by the radioactive isotope material in the body of the patient. In this way, the detector measures only the radiation emitted by the blood contained in the turns of the tube wrapped around it. This allows the patient to move without affecting the counting rate. Alternatively, it is possible to use one or more detectors mounted on the hospital bed or on the floor under the bed to measure the radiation directly from the patient. The counting rate could be made nearly independent of patient position; however, this method would require a more elaborate and expensive detector design. The apparatus of the preferred embodiment has the advantage of being simple and easy to install. The tubing containing the blood can be removed very quickly from the scintillation detector in an emergency. There are no problems with sterility since the detector never comes in contact with the blood but only the outer surface of the standard presterilized plastic tubing 2.

As shown in FIG. 1, the pulse count train output of the photomultiplier 6 is connected to an amplifier 10 and pulse-height window discriminator 12 is a conventional way. A window discriminator, with upper and lower pulse-section levels, is used rather than a simple lower level discriminator as it reduces the background radiation count from 1,000 to 300 pulse counts per minute without affecting the sensitivity of the device. The pulse count train output from the discriminator 12 goes to a count ratemeter 14 which continuously displays the percentage of the initially injected radioactively labelled glomerular substance remaining in the bloodstream of the patient undergoing dialysis. The correlation between the percentage remaining of a radioactively labelled glomerular substance (shown on the meter) and the percentage remaining of each impurity constitutent of the bloodstream is established experimentally before dialysis begins for the particular glomerular substance to be injected. The ratemeter 14 may be either of a standard type or may include means for compensating for the short decay period or half-life of the injected radioactive material, as explained more fully below. The signal output of the count ratemeter 14 is connected to a display meter. An adjustment to the count ratemeter scale factor resistance 17 allows the display meter 16 to be set at 100% initially so that the correlation between the impurity constituents initially present in the bloodstream, and the radioactively labelled glomerular substance injected thereinto can be established. Each is initially arbitrarily designated as 100%; and as noted above the concentration of the impurities and radioactively labelled substance is reduced by dialysis at substantially the same rate, so that the indicated remaining percentage of radioactive material also indicates the remaining percentage of impurities. A residual level of the radioactive substance of about 30% of initial value is ordinarily considered to be correlated to a safe level of remainder impurities. Auxiliary equipment in the monitoring system includes a high-voltage power supply 20 for the photo-multiplier 6 and a chart recorder or printer 22 if a permanent record is required.

Figure 4:
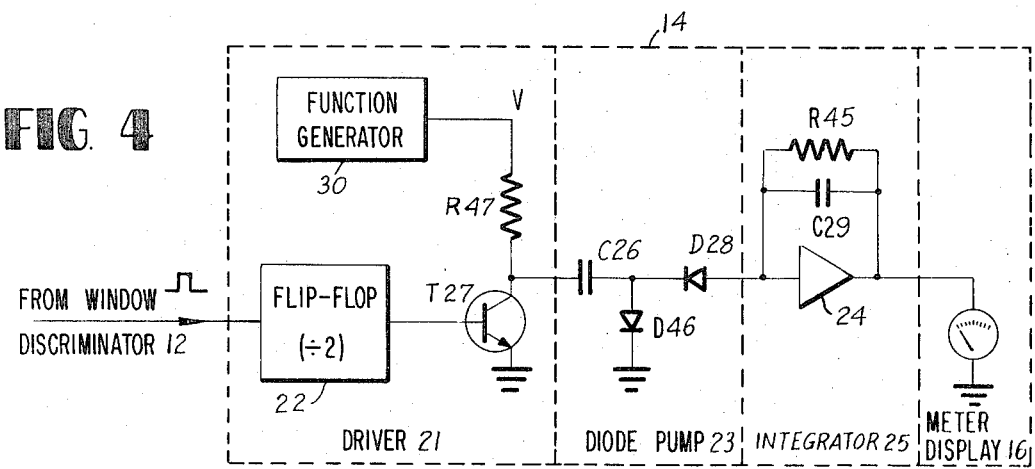
FIG. 4 is a schematic diagram of a count ratemeter usable in the embodiment of FIG. 1.

FIG. 4 shows a count ratemeter including means for compensating for the rapid decay rate of the short-lived radioactive isotope material used to label the glomerular substance in the preferred embodiment of the described method. This compensation is necessary so that the decay of the radioactive isotope does not cause the meter 14 to indicate that the radioactive substance (and therefore the impurities) are being dialyzed from the bloodstream at a faster rate than is actually occurring.

It is well known in the art to measure the relative amount of radioactive material in a closed vessel by observing the counting rate induced in an external detector by the emitted radiation. If the quantity of material remains unchanged, the counting rate will not vary provided that the half-life of the radioactive nuclei is very long. Should a fraction, $n$, of the material then be removed, the initial counting rate $R_0$ will decrease by the factor $(1-n)$ and will become:

$$R = (1-n)R_0$$

Consequently, a measurement of $R$ and $R_0$ allows $n$ to be calculated.

If, however, the half-life of the radioactive isotope material is relatively short, as it is in the preferred embodiment described, the observed counting rate $R$ will gradually decrease even though the quantity of material remains unchanged. After some time, $t$, the rate will be:

$$R = R_0 e^{-\lambda t}$$

where $\lambda$ is a constant inversely proportional to the half life of the material. If now a fraction, $n$, of the short-lived radioactive material is removed, the observed counting rate will be:

$$R'=(1-n)R_0 e^{-\lambda t}$$

so that one cannot determine $n$ solely by a measurement of $R'$ and $R_0$ but must know $t$, as well.

To overcome this defect, the count ratemeter (to measure $R'$) includes means for automatically compensating for the decay of the isotope. In other words, the meter becomes more sensitive as time goes on by a factor $e^{\lambda t}$, thus cancelling out the time dependence seen in the above derivation. This allows a simple continuous measurement of $(1-n)$ i.e., the percentage remaining of initially injected radioactive material, from the ratio of $R'/R_0$ as before.

In the embodiment disclosed standard pulses of the pulse count train from the scintillation crystal 4 are applied to the count ratemeter 14 shown in FIG. 4 which generates a voltage signal indicating the rate at which pulses are being received from the scintillation crystal. The ratemeter 14 operates by adding a pre-established quantity of charge to a capacitor resistor parallel combination each time a pulse is received. To effect the necessary compensation for the decay of the radioactive isotope, the charging pulse is made larger by increasing the voltage applied by means of a function generator 30 described more fully below.

In particular, the pulse count train from the scintillation detector is applied through the window discriminator 12 to a driver circuit 21 to trigger a flip-flop 22 which halves the counting rate and tends to de-randomize the time of arrival of the pulses. Capacitor C26 of diode pump 23 is normally charged to a potential V, the driver transistor T27 being turned off. When the flip-flop 22 puts out a pulse, transistor T27 turns on, grounding its collector and causing the charge on capacitor C26 to be transferred through diode D28 of the diode pump 23 to the input of the integrator amplifier 24 of integrator 25. This amplifier 24 integrates the charge on capacitor C29 in the conventional way; resistor R45 is provided to discharge capacitor C29 slowly. The display meter 16 reads the average voltage at the output of the integrator. Since the rate at which charge is added to capacitor C24 depends on the frequency of input pulses, the meter reading is proportional to this pulse rate.

For the compensated ratemeter used in this preferred embodiment the reference potential V applied to the input of diode pump 23 is not held constant (as in the normal ratemeter) but is made to increase with the required positive exponential form $e^{\lambda t}$ derived above. The quantity of charge Q transferred to capacitor C29 associated with amplifier 24 of integrator 25 from diode pump capacitor C26 for each pulse therefore must be, in accordance with the above derivation:

$$Q = V \cdot C_{26} = V_0 e^{\lambda t} \cdot C_{26} \quad (V_0 = \text{constant})$$

Q, thus, also increases exponentially as the injected radioactive isotope decays exponentially, causing the ratemeter to be more sensitive as time goes on. The voltage V (FIG. 4) which represents the exponential rate of decay of the radioactive isotope during its decay period is provided through driver circuit 21 by function generator 30 whose output voltage is applied across resistor R47 to the input of diode pumps 23. This voltage V approximates the positive exponential function required to charge diode pump capacitor C26 to the required time-varying value.

In the preferred embodiment disclosed, the positive exponential voltage function desired is approximated in function generator 30 (FIG. 3) by 2 straight lines since the accuracy is adequate for the application.

Figure 2:
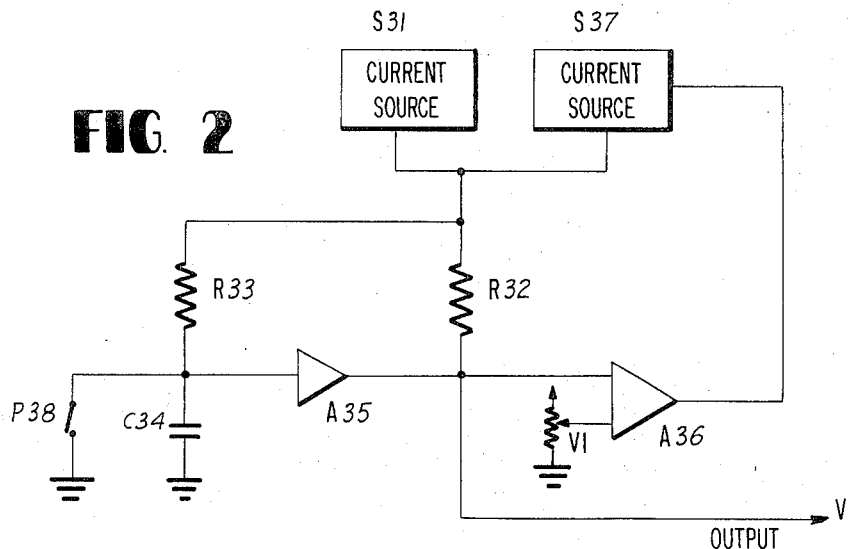
FIG. 2 is a schematic diagram of an exemplary embodiment of a function generator usable in the meter of FIG. 4.
Figure 3:
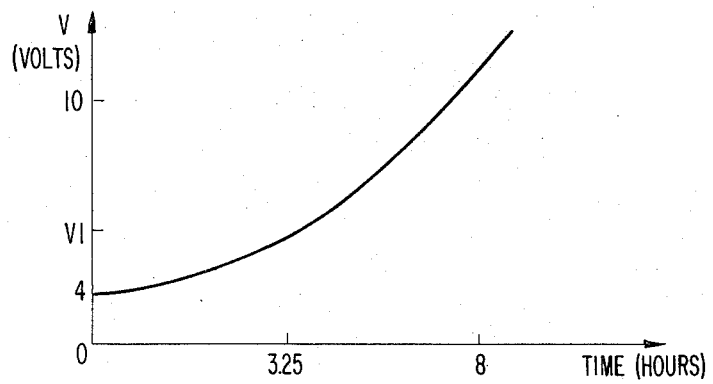
FIG. 3 is a diagram of an exemplary time varying voltage output of the function generator of FIG. 2.

The function generator 30 is shown in detail in FIG. 2 wherein current sources S31 causes a constant current to flow in resistor R32 and thereby develops a constant voltage across it. This voltage is applied to the high-value resistor R33 in series with the low-leakage capacitor C34. The voltage across C34 rises linearly and is sensed by the very high input impedance amplifier 35 whose output is the required isotope decay compensation ratemeter input voltage V. When V has increased to a predetermined value V1 (FIG. 3) the differential amplifier A36 turns on, activating the second current source S37. This increases the current through R32 and changes the slope of the output voltage as shown in FIG. 3. In this specific embodiment, ratemeter input voltage V is initially 4 volts at time zero (when switch P1 is closed). About 3.25 hours after switch P38 is opened to initiate the measuring cycle V is equal to V1 or about 5.75 volts. After 8 hours, V is approximately 10 volts. Since the sensitivity of the disclosed ratemeter is proportional to the change in V, it is thereby increased by a factor of 2.5 between time zero and 8 hours. Thus, the count ratemeter diode pump circuit 23 and the function generator 30 cooperate so as to increase the sensitivity of the ratemeter 14 at the correct rate to compensate for the falling counting rate of the scintillation detector pulse count train due to the decay of the radioactive isotope material. This compensation is necessary because the falling counting rate could otherwise be interpreted to reflect a falsely increased rate of removal of the radioactive labelled glomerular substance (and impurities) from the bloodstream.

Alternate method of radioactive isotope decay compensation are available, although they are not so easily adapted to the use disclosed herein; the voltage could be kept constant but the width of the pulses applied to integrator amplifier 24 increased; the effective capacitance could be changed with time; other circuits could be used. A logarithmic count ratemeter (in which the output is proportional to the logarithm of the pulse count train input rate R) could be used, for then the required scale changes linearly with time. Many non-electronic methods are also feasible; for example, in a logarithmic count ratemeter, the electronics could be left untouched and a small clock motor used to drive the meter scale backwards on the output device.

It should be noted that the circuit must be adjusted to compensate for a particular radioactive isotope since each isotope has a unique value of $\lambda$ representing the unique half-life decay period of the material. This is ordinarily done experimentally. The concept could also be broadened to the use of 2 radioactive isotopes with values $\lambda_1$ and $\lambda_2$; all that is required is that it be possible to generate a voltage of the correct analog form, $$e^{(\lambda_1 + \lambda_2)t}$$

in function generator 30 and apply this to the diode pump circuit 23 of the compensated count rate meter 14.

To consider a specific example of continuous renal dialysis monitoring using the disclosed device, the patient is initially injected with the glomerular radioactive isotopic substance, and equilibrium is achieved (as described above). The main front panel *mode* switch of the dialysis machine (not shown) is turned from the OFF position to the SET position and the *range* coarse and fine controls are adjusted until the display meter 16 or recorder 22 is set to exactly 100% (full scale value). Dialysis is then started; if a short-lived isotope is being used, as is preferred, the *mode* switch is turned to the OPERATE position which automatically opens switch P38 FIG. 2) initiating the decay compensation means of function generator 30 in the ratemeter 14. If a long-lived isotope is being used, the *mode* control is left in SET position for then the ratemeter 14 need provide no compensation for isotope decay and behaves in a normal manner. As the glomerular isotopic substance is gradually removed from the bloodstream, its concentration falls, causing a corresponding decrease in the measured counting rate of the pulse count train as provided by scintillation detector 1 and a decline in the display meter value, reflecting a corresponding decline in the concentration of impurity constituents in the bloodstream. A typical record might be as follows: At time zero (start of dialysis) the display meter value is 100%; at 1 hour, value is 80%; at 2 hours, 67%; 3 hours, 57%; 4 hours, 49%, 5 hours, 42%, 6 hours, 36%; 7 hours, 31%. After the initial adjustment to 100%, no further manipulation of the display meter 16, chart recorder 22 or other output device is needed, the readout being automatic.

Values of radioactive isotope dose may range from 10 millicuries (mCi.) down to 0.2 mCi.; the lower values are preferable, and are usable where detector design is optimized and its sensitivity increased by using optimized Sodium Iodide crystals and lead shielding.

No modification to the standard dialysis equipment is required to use the described device. Enough slack tubing 2 is provided for wrapping around the scintillation crystal 4. However, to get even more sensitivity (so as to reduce the isotope dosage by a factor of 5 or 10) a sterilized disposable plastic cell may be provided that can be inserted in the blood line by cutting it and attaching the ends to the ports of the cell. The present technique measures the radioactivity in approximately 10 ml. of blood; by using such a cell, it would be possible to increase this to 50 ml. (or more) with a consequent five (or more) fold sensitivity increase. It is desirable to reduce the isotope quantity as much as possible since this measurement will be made many times, and the radiation dose to the patient will be cumulative.

An exemplary optimized embodiment of the inventive method and apparatus uses a 1" diameter by 1" long sodium iodide scintillation crystal 4 with 4 turns of tubing 2 wrapped around it. This gives a detection sensitivity of 4.1 counts per minute when the concentration of $Tc^{99m}$ radioisotope in the patient's blood is 1 picocurie per milliliter (ml.). For a typical patient, this corresponds, at the start of dialysis, to about 350 counts per minute per microcurie ($\mu$Ci.) of $Tc^{99m}$ injected. With an injected dose of 200 $\mu$Ci. (0.2 mCi.) the initial counting rate will be 70,000 counts per minute. At the end of dialysis, the rate will have dropped to about 7,000 counts per minute. The crystal is shielded on 5 sides with 0.5 inch of lead; the bottom being open, the normal background counting rate is about 300 counts per minute. The background is about 5% of the signal at the end of dialysis. This ratio should not be exceeded unless corrections are made; it thus effectively determines the initial patient dose that must be used.

Other modifications of the disclosed embodiment may occur to one skilled in the art which fall within the spirit and scope of this invention, the bounds of which are defined only by the claims attached hereto.

What is claimed is:

1. Apparatus for monitoring the rate of removal of a radioactively labelled substance initially present in a liquid, comprising a tube carrying said liquid as a flowing stream; a liquid treating means in said tube for removing said radioactively labelled substance from said liquid; detection means for providing a pulse count train representing the concentration of radioactive material in said flowing liquid stream; and count ratemeter means responsive to said pulse count train for determining the portion of said radioactively labelled substance remaining in said liquid.

2. Apparatus as claimed in claim 1 wherein said count ratemeter means includes means for displaying said remaining portion of said radioactively labelled glomerular substance as a percentage of said initially present radioactively labelled substance.

3. Apparatus as claimed in claim 2 wherein said radioactive isotope has a short decay period and said count ratemeter means includes signal generating means coupled to said display means for generating a signal representing said remaining portion of said radioactively labelled glomerular substance, and function generating means for generating an analog voltage representing the inverse of the decay rate of said radioactive isotope, said analog signal being coupled to said signal generating means whereby the sensitivity of said ratemeter means is increased to compensate for the falling pulse count train output of said detection means due to the decay of the radioactive isotope.

4. Apparatus as claimed in claim 3 wherein said radioactive isotope has an exponential decay rate, said signal generating means includes an integrating amplifier for generating a signal proportional to the pulse rate of said pulse count train representing the remaining portion of said radioactively labelled glomerular substance, and said function generator includes a reference voltage capacitor, the voltage across said reference capacitor being coupled to the input of said integrating amplifier, at least a first source for charging said capacitor during a first portion of said isotope decay period and a second source for charging said capacitor during a second portion of said isotope decay period whereby the exponential decay rate of said isotope is approximated by first and second linear charging rates of said capacitor during said period of exponential decay.

5. Apparatus as claimed in claim 1 wherein said tube includes a pair of ends for connection to the blood carrying organs of a living subject, said flowing liquid stream comprising the bloodstream of said subject, and said liquid treating means includes a dialyzer for removing impurities from said bloodstream, the remaining portion of said radioactively labelled substance continuously representing the portion of said impurities remaining in said bloodstream.

6. Apparatus as claimed in claim 5 wherein said radioactively labelled substance comprises a glomerular carrier substance and a radioactive isotope material labelling said glomerular carrier substance.

7. Apparatus as claimed in claim 6 wherein said glomerular substance is diethyltriamine-pentaacetic acid and said radioactive isotope is selected from the group consisting of $In^{113m}$ and $Tc^{99m}$.

8. A method for monitoring the rate of removal of a dialyzable constituent of a liquid flowing in a stream in a tube without interfering with the flow of said liquid comprising the steps of injecting a radioactively labelled glomerular substance into said liquid,
passing said liquid stream through the dialyzing membrane of a dialyzer to remove the dialyzable constituent and the radioactively labelled glomerular substance from said stream, and,
determining the portion of said injected radioactively labelled glomerular substance remaining in said liquid as an indirect measure of the content of said dialyzable component in said liquid stream.

9. A method as claimed in claim 8 wherein said determining step comprises providing a scintillation detection system adjacent said tube for continuously indicating by pulse rate the amount of radioactively labelled glomerular substance remaining in said stream, and coupling a display device to said scintillation detection system for displaying said remaining radioactively glomerular substance as a percentage of said injected radioactively labelled glomerular substance, said percentage being substantially equal to the percentage of said dialyzable component remaining in said liquid stream.

10. A method as claimed in claim 9 wherein said liquid stream is a human bloodstream, and said glomerular substance is diethyltriaminepentaacetic acid labelled by a radioactive isotope selected from the group consisting of $In^{113m}$ and $Tc^{99m}$.

11. The method of claim 8 wherein said glomerular substance is diethyltriamine-pentaacetic acid labelled by a radioactive isotope selected from the group consisting of $In^{113m}$ and $Tc^{99m}$.

12. The method of claim 8 including the step of delaying the beginning of passing said liquid stream through said dialyzing membrane until said injected radioactively labelled glomerular substance is equilibrated through said flowing liquid stream.

References Cited

UNITED STATES PATENTS

| 3,194,663 | 7/1965 | Higgins | 210—96 X |
| 3,268,728 | 8/1966 | Stoddart et al. | 128—2 A |

FRANK A. SPEAR, Jr., Primary Examiner

U.S. Cl. X.R.

128—2 A; 210—85, 321